US012769515B2

(12) United States Patent
Bondarenko et al.

(10) Patent No.: US 12,769,515 B2
(45) Date of Patent: Oct. 20, 2026

(54) METHOD FOR PERMUTING DIMENSIONS OF A MULTI-DIMENSIONAL TENSOR

(71) Applicant: Arm Limited, Cambridge (GB)

(72) Inventors: Anton Bondarenko, Lund (SE); Anil Kumar Metla, Lund (SE); Robert David Hughes, Cambridge (GB); Joshua Mark Jian Li Slater, Cambridge (GB); Rajanarayana Priyanka Marigi, Lund (SE); Barbara Cerato, Lund (SE)

(73) Assignee: Arm Limited, Cambridge (GB)

( * ) Notice: Subject to any disclaimer, the term of this patent is extended or adjusted under 35 U.S.C. 154(b) by 1217 days.

(21) Appl. No.: 17/727,122

(22) Filed: Apr. 22, 2022

(65) Prior Publication Data

US 2022/0244919 A1 Aug. 4, 2022

Related U.S. Application Data

(63) Continuation-in-part of application No. 17/080,302, filed on Oct. 26, 2020, now Pat. No. 12,412,081.

(51) Int. Cl.
*G06F 7/78* (2006.01)
*G06F 7/76* (2006.01)
(Continued)

(52) U.S. Cl.
CPC ................ *G06F 7/78* (2013.01); *G06F 13/16* (2013.01); *G06N 3/04* (2013.01); *G06F 7/76* (2013.01); *G06F 2213/28* (2013.01)

(58) Field of Classification Search
CPC .......... G06F 7/76; G06F 7/78; G06F 2213/28; G06F 13/16; G06F 12/00; G06F 12/0638;
(Continued)

(56) References Cited

U.S. PATENT DOCUMENTS 11,416,959 B1 * 8/2022 Tariq .................... G05D 1/0088
2017/0323224 A1 11/2017 Bruestle et al.
(Continued)

FOREIGN PATENT DOCUMENTS

| | | | |
|---|---|---|---|
| EP | 3387549 | B1 | 10/2018 |
| JP | 2020024524 | A | 2/2020 |
| WO | 2016007069 | A1 | 1/2016 |

OTHER PUBLICATIONS

Combined Examination and Search Report dated Nov. 2, 2023 for GB Application No. GB2305884.5.

*Primary Examiner* — Emily E Larocque
(74) *Attorney, Agent, or Firm* — EIP US LLP

(57) ABSTRACT

A method performed by a processor for permuting dimensions of a multi-dimensional tensor is described. The multi-dimensional tensor contains an array of tensor values in three or more dimensions that are stored in a first storage unit. The array of tensor values is transferred from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor. The dimensions of the multi-dimensional tensor may be further permuted by a programmable engine within the processor.

20 Claims, 15 Drawing Sheets

(51) Int. Cl.
*G06F 13/16* (2006.01)
*G06N 3/04* (2023.01)

(58) Field of Classification Search
CPC ............. G06F 12/0646; G06F 12/0692; G06F 12/0835; G06F 12/1009; G06F 15/7821; G06F 15/8061; G06N 3/063; G06N 3/0495
See application file for complete search history.

(56) References Cited

U.S. PATENT DOCUMENTS

| | | | | |
|---|---|---|---|---|
| 2019/0042241 | A1* | 2/2019 | Akin | G06F 9/3013 |
| 2019/0391796 | A1 | 12/2019 | Brady et al. | |
| 2020/0202198 | A1 | 6/2020 | Lee et al. | |
| 2020/0409664 | A1 | 12/2020 | Li et al. | |
| 2021/0035258 | A1* | 2/2021 | Ray | G06F 9/3001 |
| 2023/0244629 | A1* | 8/2023 | Marcovitch | G06F 13/42<br>710/105 |

* cited by examiner

| Permutation | Operation Sequence |
|---|---|
| 0132 | 1. Data in NHWC in DRAM<br>2. Load pretending it is NCHW → 0231<br>3. NWCH, PLE swap HW (which is actually WC) → 0321<br>4. NCWH, Save NCHW (which will actually save as NHCW)<br>5. Next layer interprets as NHWC->0132 |
| 0213 | 1. Data in NHWC in DRAM<br>2. Load NHWC ->0123<br>3. NHWC, PLE swap HW ->0213<br>4. NWHC, Save NHWC (which will actually save as NWHC)<br>5. Next layer interprets as NHWC |
| 0231 | 1. Data in NHWC in DRAM<br>2. Load pretending it is NCHW->0231<br>3. NWCH, Save NHWC (which will actually save as NWCH)<br>4. Next layer interprets as NHWC->0231 |
| 0312 | 1. Data in NHWC in DRAM<br>2. Load NHWC<br>3. NHWC, Save NCHW->0312<br>4. Next layer interprets as NHWC->0312 |
| 0321 | 1. Data in NHWC in DRAM<br>2. Load pretending it is NCHW->0231<br>3. NWCH, PLE swap HW (which is actually WC)->0321<br>4. NCWH, Save NHWC (which will actually save as NCWH)<br>5. Next layer interprets as NHWC->0321 |

Fig. 5

Implementation of 0231

NHWC 1x8x3x4 0123

WXC = 3X4

| | | | | | | | | | | | |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 6a

H=8

NHWC 1x3x4x8 0231

| | | | | | | | | | | | | | | | |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |
| A | B | C | D | E | F | G | H | A | B | C | D | E | F | G | H |

| | | | | | | | | | | | | | | | |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |
| A | B | C | D | E | F | G | H | A | B | C | D | E | F | G | H |

WXC = 4X8

H=3

Fig. 6b

Implementation of 0213

NHWC 1x8x3x4 0123

WXC = 3X4

| | | | | | | | | | | | |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 7a

H=8

NHWC 1x3x8x4 0213

W X C = 8 X 4

| | | | | | | | | | | | | | | | |
|---|---|---|---|---|---|---|---|---|---|---|---|---|---|---|---|
| A | B | C | D | A | B | C | D | A | B | C | D | A | B | C | D |
| A | B | C | D | A | B | C | D | A | B | C | D | A | B | C | D |
| A | B | C | D | A | B | C | D | A | B | C | D | A | B | C | D |

| | | | | | | | | | | | | | | | |
|---|---|---|---|---|---|---|---|---|---|---|---|---|---|---|---|
| A | B | C | D | A | B | C | D | A | B | C | D | A | B | C | D |
| A | B | C | D | A | B | C | D | A | B | C | D | A | B | C | D |
| A | B | C | D | A | B | C | D | A | B | C | D | A | B | C | D |

H=3

Fig. 7b

Implementation of 0321

NHWC 1x8x3x4 0123

WXC = 3X4

| | | | | | | | | | | | |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 8a H=8

NHWC 1x3x4x8 0231

| | | | | | | | | | | | | | | | |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |
| A | B | C | D | E | F | G | H | A | B | C | D | E | F | G | H |

| | | | | | | | | | | | | | | | |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |
| A | B | C | D | E | F | G | H | A | B | C | D | E | F | G | H |

WXC = 4X8 H=3

Fig. 8b

NHWC 1x8x3x4 0123

WXC = 3X4

| | | | | | | | | | | | |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 9a

H=8

NHWC 1x4x8x3 0312

| | | | | | | | | | | | |
|---|---|---|---|---|---|---|---|---|---|---|---|
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |

| | | | | | | | | | | | |
|---|---|---|---|---|---|---|---|---|---|---|---|
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |

WXC = 4X3

H=4

Fig. 9b

NHWC 1x8x3x4 0123

WXC = 3X4

| | | | | | | | | | | | |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 10a

H=8

NHWC 1x3x4x8 0231

| | | | | | | | | | | | | | | | |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |
| A | B | C | D | E | F | G | H | A | B | C | D | E | F | G | H |

| | | | | | | | | | | | | | | | |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |
| A | B | C | D | E | F | G | H | A | B | C | D | E | F | G | H |

WXC = 4X8

H=3

Fig. 10b

NHWC 1x4X3x8 0321

| | | | | | | | | | | | | | | | |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |
| A | B | C | D | E | F | G | H | A | B | C | D | E | F | G | H |
| A | B | C | D | E | F | G | H | A | B | C | D | E | F | G | H |

| | | | | | | | |
|---|---|---|---|---|---|---|---|
| A | B | C | D | E | F | G | H |
| A | B | C | D | E | F | G | H |
| A | B | C | D | E | F | G | H |
| A | B | C | D | E | F | G | H |

H=4

WXC = 3X8

Fig. 10c

NHWC 1x8x4x3 0132

| | | | | | | | | | | | |
|---|---|---|---|---|---|---|---|---|---|---|---|
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |

WXC = 4X3 H=8

Fig. 10d

METHOD FOR PERMUTING DIMENSIONS OF A MULTI-DIMENSIONAL TENSOR

CROSS-REFERENCE TO RELATED APPLICATIONS

This application is a continuation-in-part under 35 U.S.C. § 120 of U.S. application Ser. No. 17/080,302, filed Oct. 26, 2020 The above-referenced patent application is incorporated by reference in its entirety.

BACKGROUND

Field of the Invention

The present invention relates to a method for permuting dimensions of a multi-dimensional tensor.

Description of the Related Technology

Neural processing units (NPU) are specialized processors for processing neural networks. Such chips are designed to efficiently perform operations commonly required by neural networks, such as multiply-accumulate operations. Similarly, Graphics Processing Units (GPU) are specialized processors for performing graphics operations, such as matrix and vector operations relating to translation of coordinate systems.

Specialized processors, such as neural processing units and graphics processing units, may have hardware design features that allow certain types of operations to be performed efficiently and in parallel, but may also have limitations that make it more difficult to perform other operations.

For example, some neural networks require permutation of the axes of the output feature map as an operation during processing of the neural network. Examples of such neural networks might be super-resolution neural networks for obtaining higher resolution images from lower resolution images. A further situation where permuting dimensions may be required is during the training of a neural network.

In other situations, permuting the dimensions of a data set may be a pre-processing step for efficient matrix multiplication algorithms because the permutation may provide improved cache access patterns.

Unfortunately, some specialized processor hardware designs make performing operations for permuting dimensions of a multi-dimensional tensor difficult to perform efficiently.

SUMMARY

According to a first aspect there is provided a method performed by a processor for permuting dimensions of a multi-dimensional tensor, wherein the multi-dimensional tensor contains an array of tensor values in three or more dimensions that are stored in a first storage unit, the method comprising: transferring the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

According to a second aspect there is provided a processor for permuting dimensions of a multi-dimensional tensor, wherein the multi-dimensional tensor contains an array of tensor values in three or more dimensions that are stored in a first storage unit, the processor comprising: a controller configured to control transfer of the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

According to a third aspect there is provided a non-transitory computer-readable storage medium storing instructions that, when performed by a processor, cause the processor to perform a method for permuting dimensions of a multi-dimensional tensor, wherein the multi-dimensional tensor contains an array of tensor values in three or more dimensions that are stored in a first storage unit, the method comprising: transferring the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

BRIEF DESCRIPTION OF THE DRAWINGS

Embodiments will now be described with reference to the accompanying drawings in which:

FIG. 5 is a table showing operation sequences for permuting dimensions of a tensor;

FIGS. 6*a* and 6*b* illustrate tensors in a 0231 permutation;

FIGS. 7*a* and 7*b* illustrate tensors in a 0213 permutation;

FIGS. 8*a* to 8*c* illustrate tensors in a 0321 permutation;

FIGS. 9*a* and 9*b* illustrate tensors in a 0312 permutation;

FIGS. 10*a* to 10*d* illustrate tensors in a 0132 permutation;

DETAILED DESCRIPTION

Figure 1:
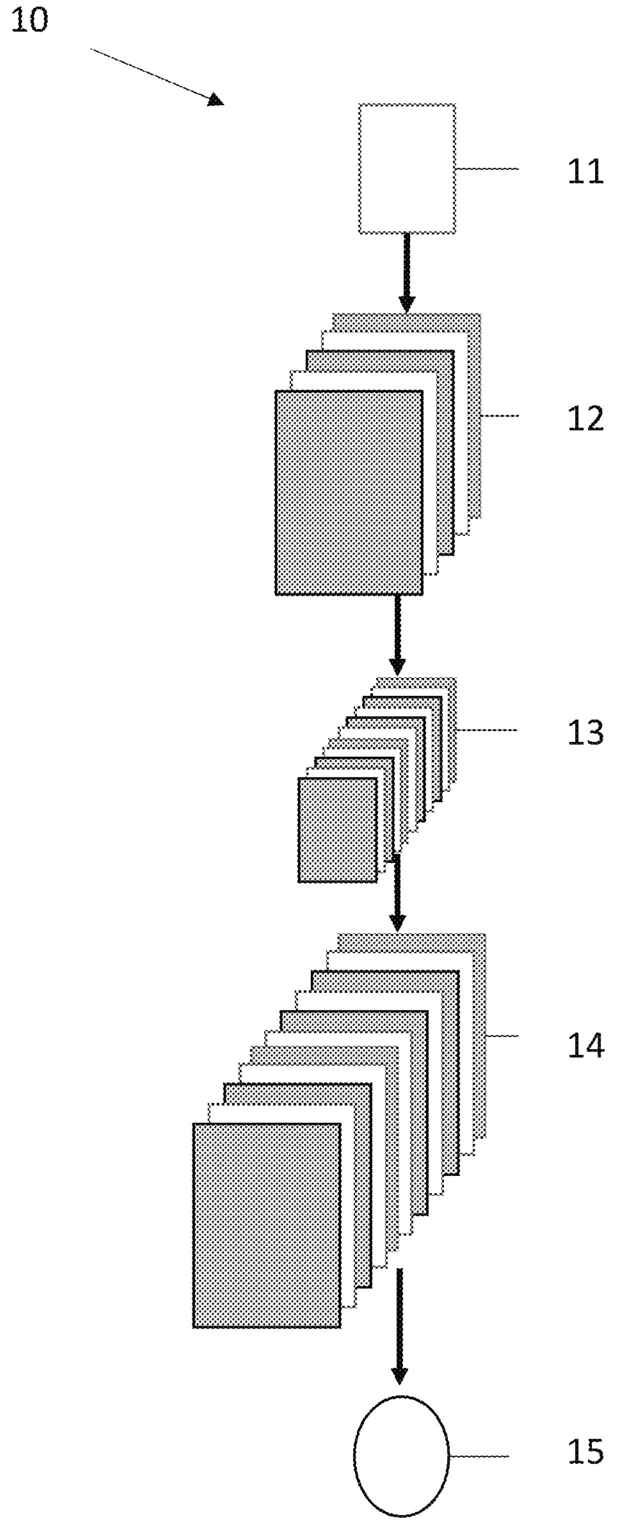
FIG. 1 is a diagram showing steps of processing a neural network.

Before discussing particular embodiments with reference to the accompanying figures, the following description of embodiments is provided.

A first embodiment provides a method performed by a processor for permuting dimensions of a multi-dimensional tensor, wherein the multi-dimensional tensor contains an array of tensor values in three or more dimensions that are stored in a first storage unit, the method comprising: transferring the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

Throughout this specification the term permute is used to refer to an operation that changes the order of at least two dimensions of a tensor. The term 'permute' is to be understood to include the term 'transpose', which may be used elsewhere in the art for the same or similar operation.

The first dimension of the multi-dimensional tensor is different from the second dimension of the multi-dimensional tensor. The process of transferring the array of tensor values arrayed along a first dimension of the multi-dimensional tensor and writing corresponding values to the second storage in locations corresponding to a second dimension of the multi-dimensional tensor has the effect of reordering the tensor values. The locations in the second storage corresponding to a second dimension of the multi-dimensional tensor are locations in the second storage that correspond to a second dimension of the multi-dimensional tensor in a data format by which a process will subsequently read the multi-dimensional tensor from the second storage.

In other words, the first dimension of the multi-dimensional tensor may be a first dimension of the multi-dimensional tensor in a first data format in which the multi-dimensional tensor is stored in the first storage. The second dimension is a second dimension of the multi-dimensional tensor in a second data format in which the tensor is stored in the second storage. The first and second data format may be the same data format or a different data format.

The first storage unit may be one of an external storage unit in communication the processor and a local storage unit of the processor. The second storage unit may be the other of the external storage unit in communication with the processor and the local storage unit of the processor.

The processor may be at least one of a neural processing unit, a graphics processing unit, a coprocessor, an accelerator and a central processing unit.

The multi-dimensional tensor may be a map of a neural network, such as an input feature map or output feature map.

The processor may comprise one or more programmable engines. The method may further comprise the one or more programmable engines permuting a pair of dimensions of the multi-dimensional tensor.

The one or more programmable engines may have a maximum number of tensor values that it can operate on in a cycle. The method may comprise the one or more programmable engines sequentially: reading sub-blocks of the multi-dimensional tensor from a local storage, permuting the pair of dimensions of the sub-block of the multi-dimensional tensor and writing the permuted sub-blocks to the local storage of the processor, wherein the sub-blocks are read from and written to the local storage using addresses in the local storage so as to re-order the sub-blocks to complete the permutation of the pair of dimensions across the multi-dimensional tensor, wherein the local storage is one of the first storage unit and the second storage unit.

The one or more programmable engines may be a plurality of programmable engines, wherein the method comprises two or more of the programmable engines permuting the pair of dimensions of the multi-dimensional tensor in parallel.

The tensor values may be read from the first storage and written to the second storage in stripes of data.

The method may comprise transferring the array of tensor values from the second storage unit to the first storage unit. Transferring the stripe of tensor values from the first storage unit to the second storage unit may occur in parallel with transferring another stripe of tensor values from the second storage unit to the first storage unit.

The method may further comprise one or more programmable engines permuting a pair of dimensions of a further stripe of the multi-dimensional tensor in parallel with at least one of transferring the stripe of tensor values from the first storage unit to the second storage unit and transferring another stripe of tensor values from the second storage unit to the first storage unit.

The first storage may be an external storage in communication with the processor and the second storage may be a local storage of the processor. The method may further comprise the one or more programmable engines permuting a pair of dimensions of the multi-dimensional tensor stored in the second memory. The method may further comprise transferring the array of tensor values that have been permuted by the one or more programmable engines from the second storage unit to the first storage unit by reading tensor values from the second storage that are arrayed along a dimension of the multi-dimensional tensor and writing the corresponding tensor values to the second storage in locations corresponding to a different dimension of the multi-dimensional tensor. Such a method may have the effect of permuting a tensor with a set of dimensions 0123 originally stored in the first storage to a tensor with dimensions 0132 in the first storage.

The first storage may be an external storage in communication with the processor and the second storage may be a local storage of the processor. The method may further comprise transferring the array of tensor values from the second storage unit to the first storage unit without further permuting the dimensions of the tensor. Such a method may have the effect of permuting a set of dimensions 0123 of the tensor originally stored in the first storage to a tensor with dimensions 0231 in the first storage.

The first storage may be a local storage of the processor and the second storage may be an external storage in communication with the processor. The method may further comprise transferring the array of tensor values from the second storage unit to the first storage unit without permuting the dimensions of the tensor before transferring the tensor values from the first storage unit to the second storage unit. Such a method may have the effect of permuting a tensor with a set of dimensions 0123 originally stored in the second storage to a tensor with dimensions 0312 in the second storage.

The first storage may be an external storage in communication with the processor and the second storage may be a local storage of the processor. The method may further comprise the one or more programmable engines permuting a pair of dimensions of the multi-dimensional tensor stored in the second memory. The method may further comprise transferring the array of tensor values that have been permuted by the one or more programmable engines from the second storage unit to the first storage unit without further permuting the dimensions of the tensor. Such a method may have the effect of permuting a tensor with a set of dimensions 0123 originally stored in the first storage to a tensor with dimensions 0321 in the first storage.

A second embodiment may provide a processor for permuting dimensions of a multi-dimensional tensor, wherein the multi-dimensional tensor contains an array of tensor values in three or more dimensions that are stored in a first storage unit, the processor comprising: a controller configured to control transfer of the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

A third embodiment may provide a non-transitory computer-readable storage medium storing instructions that, when performed by a processor, cause the processor to perform a method for permuting dimensions of a multi-dimensional tensor, wherein the multi-dimensional tensor contains an array of tensor values in three or more dimensions that are stored in a first storage unit, the method comprising: transferring the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

A further embodiment provides a method performed by a processor comprising one or more programmable engines, the method comprising the one or more programmable engines permuting a pair of dimensions of a multi-dimensional tensor stored in a local storage of the processor.

The processor may be a neural processing unit. The one or more programmable engines may be one or more programmable layer engine of the neural processing unit.

A further embodiment provides a processor comprising one or more programmable engines, wherein the one or more programmable engines is configured to permute a pair of dimensions of a multi-dimensional tensor stored in a local storage of the processor.

A further embodiment provides a non-transitory computer-readable storage medium storing instructions that when executed cause a processor having one or more programmable engines to perform a method comprising permuting a pair of dimensions of a multi-dimensional tensor stored in a local storage of the processor.

Particular embodiments will now be described, with reference to the figures.

FIG. 1 is a schematic diagram showing stages of processing of a neural network 10. An input tensor is received at input layer 11, and is processed through multiple hidden layers 12, 13 and 14. Each layer is made up of a given number of nodes—this number of nodes is referred to as the size of the layer in question. At each layer, filters are applied to values in the preceding layer to generate, for convolution layers, one or more feature maps. These filters may consist of a variety of operations, including but not limited to convolutional operations and pooling operation. Depending on the filter applied, each layer will have different processing requirements. Once all the layers 12, 13 and 14 have been passed through, an output 15 is generated.

In the first layer 11, a first set of filters are applied to the input tensor to generate one or more output feature maps. At each subsequent layer 12, 13 and 14, the filters of that layer act on the feature maps generated from the previous layer. These filter maps are comprised of data, the amount of which may exceed a local memory capacity of a processor processing the neural network, meaning that at each layer 12, 13 and 14 the data that makes up the feature map from the previous layer may need to be read from an external memory. For some smaller layers it may be possible to process the layer using local memory of the processor without making use of the external memory, however filters for the layer will likely need to be fetched from external memory. Once the filters of the current layer have been applied, the data making up the feature map generated by that layer is then written to the external memory in turn, if the layer is too large to be stored using local memory. Depending on the size of the feature map generated, the read and write operations associated with each layer will take a certain amount of time. Typically, for large layers, data will be streamed—that is, the data will be fetched, processed, and potentially written out, continuously.

Depending on the type of neural network and the way that the processor processes the neural network, neural network may have convolutional neural network layers, fully connected layers, recurrent neural network layers, fused layers etc. Similarly, kernel size and depth, stride, and activation function will affect the amount of processing required. Furthermore, the processor may support various optimizations, for example sparsity optimization, that may impact the amount of processing performed by the NPU.

Figure 2:
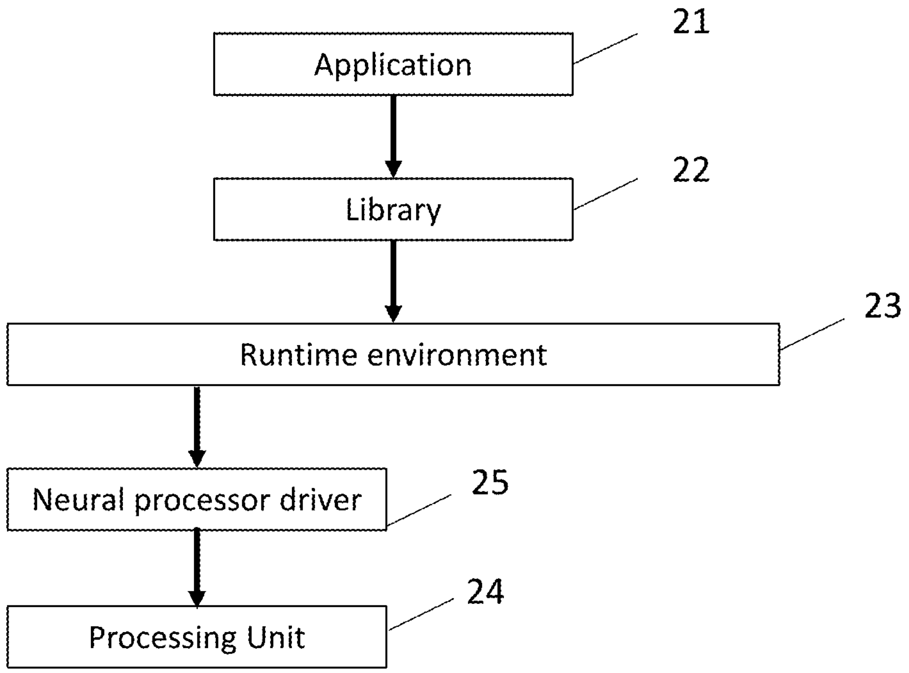
FIG. 2 is a block diagram showing a software architecture of a mobile device.

FIG. 2 shows how a neural network 10 may be deployed in a mobile device application 21 on a mobile device. An application 21 includes a library 22 which it may access, when the application is being executed, to make requests to a neural network runtime environment 23. The neural network runtime environment 23 is configured to manage hardware accelerated processing of calculations required by the convolutional neural network in the application 21. The neural network runtime environment 23 may allocate processing tasks to a dedicated neural processing unit 24, which enables hardware acceleration. A neural processor driver 25 is provided to translate requests from the neural network runtime environment 23 to the neural processing unit 24 and to perform other operations. In this way, a neural network 10 included in the application 21 can have appropriate calculations relating to the convolutional neural network hardware accelerated by processing on the neural processing unit 24.

Figure 3:
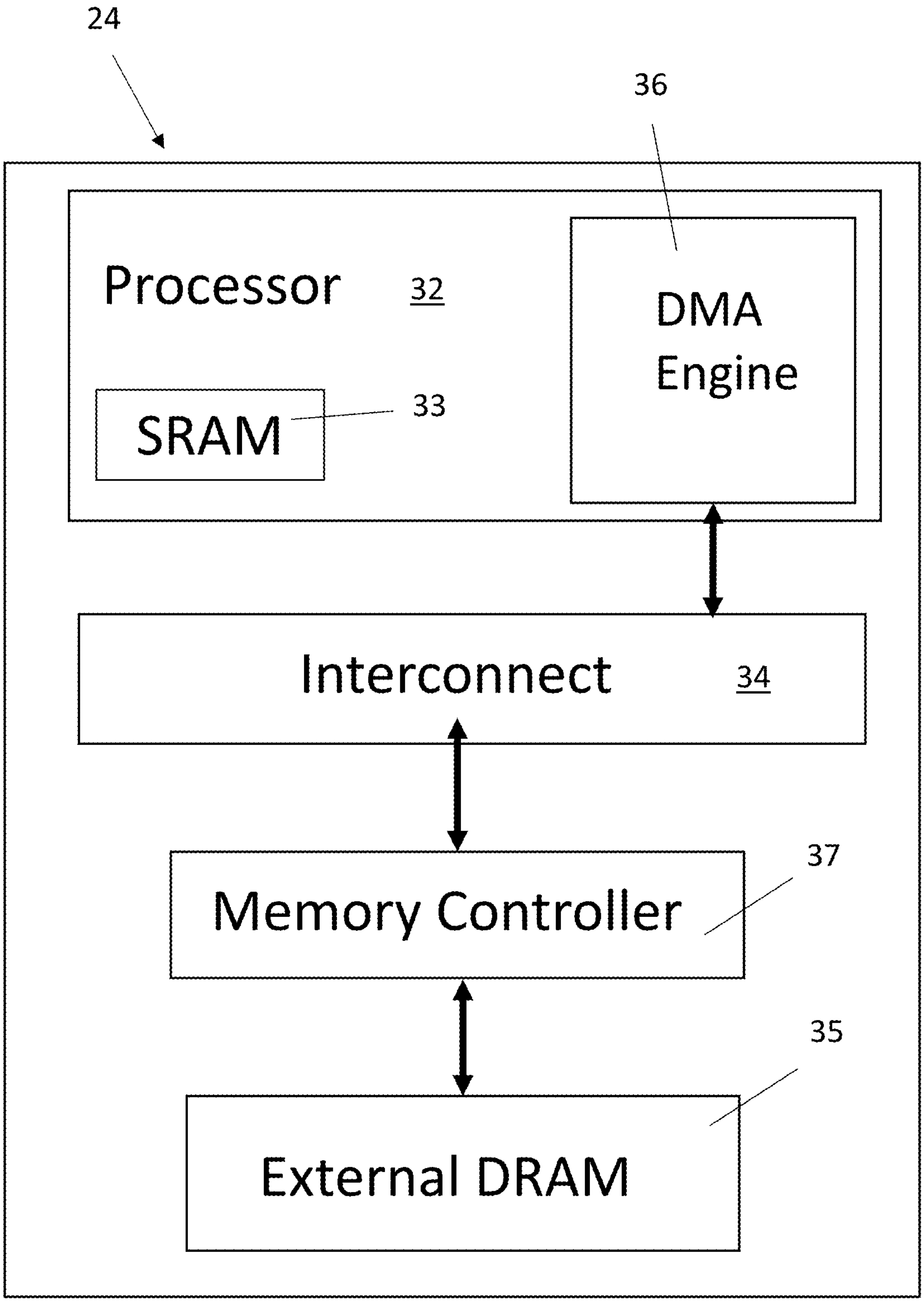
FIG. 3 is a schematic diagram showing components of a processing unit.

FIG. 3 shows more detail of the neural processing unit 24. The processing unit includes a processor 32, a data link in the form of an interconnect 34, and an external memory 35. The processor 32 comprises DMA (Direct Memory Access) engine 36 which sends transaction requests to a memory controller 37 that controls access to the external memory 35. The processor 32 contains a local memory in the form of internal memory 33 but may, in use, generate data that exceeds the local memory capacity. The processor 32 is connected to the external memory 35, across the interconnect 34. The interconnect 34 facilitates transmission of data between processor 32 and external memory element 35. The DMA engine 36 performs memory access operations, able to generate memory addresses and initiate read or write cycles from and to the external memory 35 via the memory controller 37. Processor 32 grants DMA engine 36 access to interconnect 34, allowing DMA engine 36 to initiate the memory operation while processor 32 performs other operations. Inclusion of DMA 36 in system 31 therefore allows transfer of data between processor 32 and external memory 25 with a lower processor overhead than a system without a DMA channel.

In one embodiment, interconnect 34 is an AXI interconnect configured to use an AXI interface. The AXI interface contains five separate transmission channels, to facilitate communication between processor 32 and external memory 35. There is a channel each for Read Address, Write Address, Read Data, Write Data, and Write Response. The transmission of control signal and address is performed in a different phase to the transmission of data—the address must therefore be transferred between the connected devices prior to the corresponding data transfer taking place. The Write Response channel is used to indicate successful writing of data from the processor 32 to the external memory 35.

Figure 4:
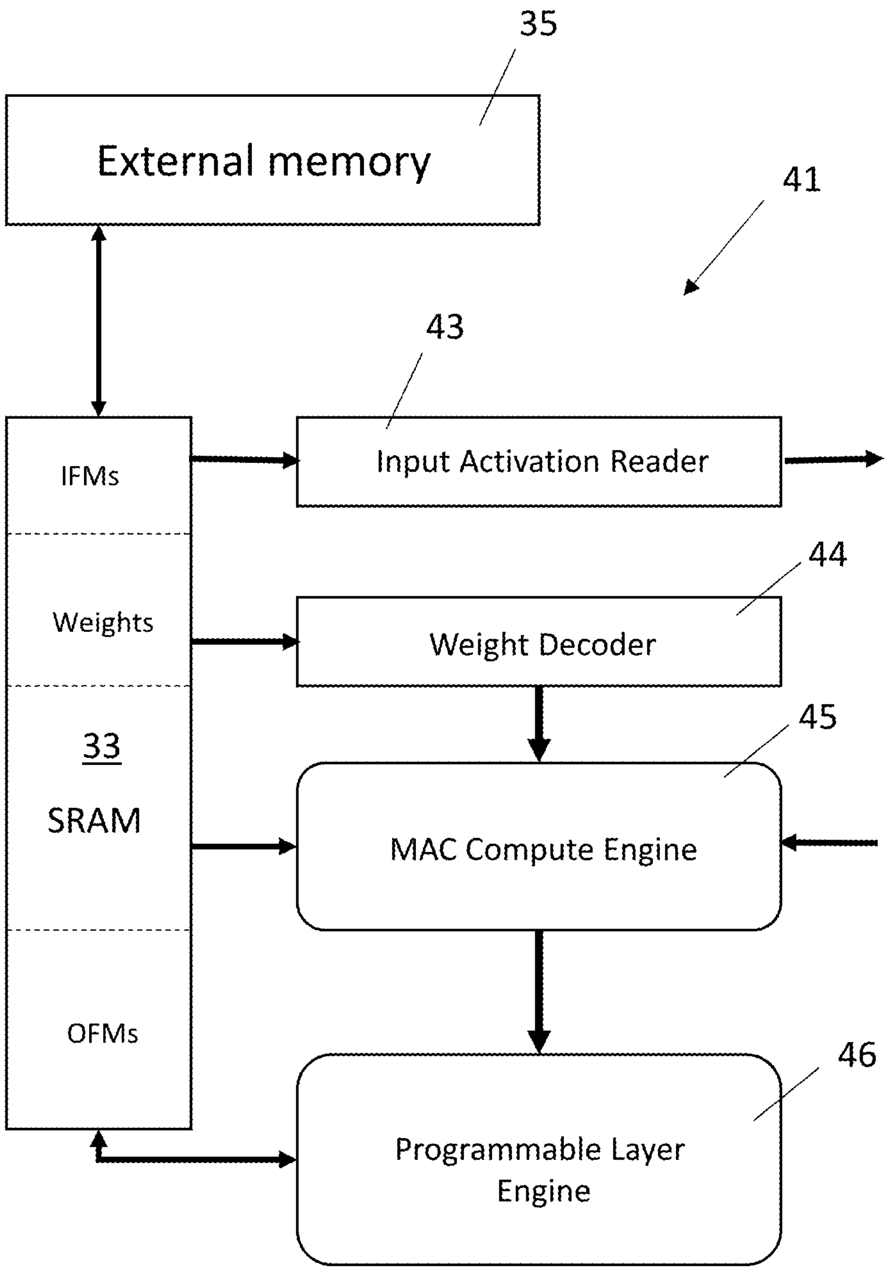
FIG. 4 is a schematic diagram showing components of a processor.

FIG. 4 shows an overview of a compute engine 41 of a type that would be found in a Neural Processing Unit (NPU) architecture, such as processor 32. The NPU will contain multiple compute engines, connected by a broadcast network (not shown). The compute engine 41 is configured to access the previously described local memory 33, such as SRAM, by means of a second DMA (not shown). When a neural network processed by the compute engine 41 is compiled—that is, mapped to a command stream—the local memory (SRAM) 33 is partitioned into sections as shown. These sections include Input Feature Maps (IFMs), Output Feature Maps (OFMs) and model weights for the neural network.

Upon execution, input activation reader 43 reads a patch of the input feature map from local memory 33. The weights for a given layer are retrieved from local memory 33 and decompressed by a weight decoder 44. The decompressed weights are passed to the Multiplier-Accumulator (MAC) Compute Engine (MCE) 45. MCE 45 also receives the input activations.

MCE 45 performs matrix multiply operations on the received data. These operations make up the filters described above in relation to FIG. 1. The result of these operations is then passed to Programmable Layer Engine (PLE) 46. PLE 46 further refines and enhances the output of MCE 45, for example by performing pooling, activation function, or other such operations. The programmable nature of PLE 46 allows a wide variety of operations to be implemented, meaning that the PLE 46 is not tied to a single operation, but allows new techniques to be added to the neural processing unit 24 containing compute engine 41 on a continuous basis.

Once PLE 46 has enhanced and refined the output of MCE 45, the resulting OFM is transferred to local memory element 33 and then to the external memory 35 if required. The transfer to external memory 35 is carried out via the DMA channel discussed in relation to FIG. 3. For some operations on certain data, PLE 46 may retrieve the data directly from local memory 33.

The output feature map data may have multiple dimensions. For the purposes of the following explanation the output feature map data will be assumed to have four dimensions, but other implementations may vary the number of dimensions.

The input layer 11 shown in FIG. 1 accepts a tensor with a shape (number of images)×(image height)×(image width)×(image depth). After passing through a convolutional layer, the image becomes abstracted to a feature map with shape (batch number)×(feature map height)×(feature map width)×(feature map channels). In the following description, the terminology NHWC is adopted to represent these dimensions, where N is the batch number, H is the height, W is the width and C is the channel. It will be assumed that a single image is being dealt with such that there is a single batch, which will always take a value of 1. The layout NHWC for example, means that the elements of the feature map are stored in an order which iterates first over the C dimension, then iterates over W, and then finally H. The DMA and other hardware units assume NHWC layout (or format) when operating on local memory 33.

A common layout for tensors stored in memory is to store each element contiguously in a linearly addressable memory (DRAM), progressing through the tensor along each dimension in turn. When retrieving or writing to the external memory 35 the DMA engine 36 is configured to read or write in one of two standard formats 'NHWC' and 'NCHW'. Note that the DMA is not conventionally configured to perform any kind of permutation, but that two data formats are supported in terms of reading from and writing to appropriate address memories.

In the course of processing some neural networks, such as some super-resolution neural networks, it may become necessary to permute the dimensions of the output feature map, often at the end of processing a layer. If the tensor is stored in the common layout described above (NHWC), the process of permuting the tensor involves moving the position of the tensor values within the memory, without performing any computation on the tensor values.

The PLE 46 described above is programmable to perform a transpose operation. However, the PLE 46 only has limited capacity to operate on tensor values. For example, it may be limited to operating on a maximum of 16×16 tensor values at a time. The PLE 46 can be programmed to perform a transpose of 16×16 tensor values by multiplying by a suitable matrix, which is known as use of a swizzle. Further, the PLE 46 is limited in that it can only operate on a slice of data from one channel at a time because channels are parallelized across multiple compute engines 41. Accordingly, the PLE 46 cannot be used to perform a permutation in a case where the channel dimension needs to be permuted.

FIG. 5 shows steps for permuting dimensions of a four-dimensional tensor NHWC in five possible combinations. There are 6 possible combinations of the three dimensions HWC. As one combination is the trivial example of no permutation of the dimensions, the five combinations are all possible permutations of the three dimensions. It is recalled that the batch number takes a value of 1 and does not need to be permuted. These possible permutations are labelled in FIG. 5 as permutations from an initial order of dimensions 0123. Accordingly, a permutation 0213 is a permutation that swaps H and W. In other words, batch, N, is equated with 0, height, H, is equated with 1, width, W, is equated with 2 and channel, C, is equated with 3

FIG. 6*a* shows a tensor stored in external memory 35 and FIG. 6*b* shows the tensor after a 0231 permutation of the dimensions. The tensor stored as illustrated in FIG. 6*a* is show with four channels, labelled A, B, C, D. These channels are repeated horizontally across the figure to give a width dimension W and extend down the figure in a H dimension as illustrated on the Figure. The initial dimensions NHWC are 1×8×3×4.

A first step in the permutation is to read the tensor from the external memory 35 as if it were stored in NCHW format. This is performed by the processor 24 controlling the DMA engine 36 to read in that format. As the data is actually stored in NHWC format the H dimension is mapped to the C dimension, the W dimension is mapped to the H dimension and the C dimension is mapped to the W dimension. This gives the desired 0231 dimension permutation. Following the transfer of the tensor values, the data has been read from the external memory 35 to the local memory 33. Accordingly, in order to return the data to the external memory 35 the data may be stored by the DMA engine 36 using its normal NHWC mode and subsequently read from the external memory 35 when required using the normal NHWC mode. Reading and writing from the external memory 35 in this way using the same mode won't permute the dimensions of the tensor which is now in the desired NWCH (0231) format.

FIG. 6*b* shows the NWCH data following the permutation of the dimensions. The resulting data has a size of 1×3×4×8 where the 8 "channels" are denoted by the values A, B, C, D, E, F, G, H. Note that the data is 4×8 values long in the horizontal direction, but the data is shown split into two parts in FIG. 6*b in* order to make the presentation clearer.

FIG. 7*a* again shows a tensor stored in the external memory 35 prior to permutation of the dimensions. FIG. 7*b* shows the data after a 0213 permutation of the dimensions. As shown in FIG. 5 the data is first loaded from the external memory 35 by the DMA engine 36 in NHWC format. As the data was originally stored in NHWC format, this does not permute the dimensions of the tensor. Next the data is processed by the PLE 46 in order to swap the H and W dimensions. Processing by the PLE 46 gives the desired 0213 permutation. The tensor following this permutation of dimensions is shown in FIG. 7*b*. The data has been read from the external memory 35 to the local memory 33. Accordingly, in order to return the data to the external memory 35 the data may be stored by the DMA engine 36 using its normal NHWC mode and subsequently read from the external memory 35 using the normal NHWC mode when required. Reading and writing from the external memory 35 in this way using the same mode won't permute the dimensions of the tensor which is now in the desired NWHC (0213) format.

FIG. 7*b* shows the NWHC data following the permutation of the dimensions. The resulting data has a size of 1×3×8×4. As the data is 8×4 values long in the horizontal direction, the data is shown split into two parts in FIG. 7*b* in order to make the presentation clearer. The difference between the tensor shown in FIG. 7*b* and the tensor shown in FIG. 6*b* can be seen in that FIG. 6*b* shows a tensor with 8 channels A to H, whereas the tensor shown in FIG. 7*b* has 4 channels.

Figure 8C:
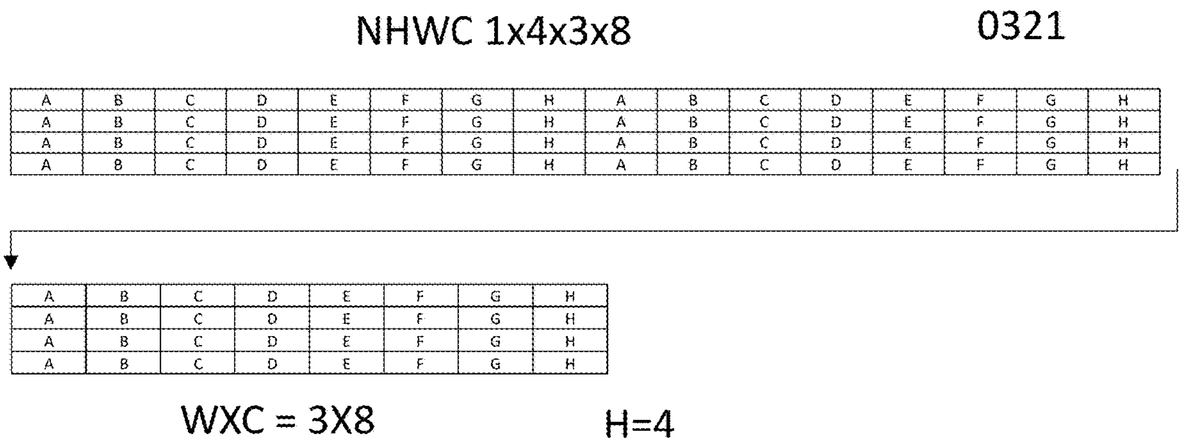

FIGS. 8*a* to 8*c* illustrate the 0321 dimension permutation. As before, FIG. 8*a* shows the tensor 0123 in the external memory 35. As described in connection with FIGS. 6*a* and 6*b*, the data is read out by the DMA engine 36 based on instructions from the processor 24 as if it were stored in NCHW format. This has the effect of permuting the dimensions to 0231 as previously described. The tensor shown in FIG. 8*b* is then subject to permutation of the H and W dimensions by the PLE 46. This converts the data to 0321 or NCWH as shown in FIG. 8*c*. The data is in the local memory 33 and can be written back to the external memory 35 and read back from the external memory 35, as needed, using the normal NHWC format, which as previously described does not permute the dimensions of the tensor.

FIGS. 9*a* and 9*b* illustrate the 0312 permutation of dimensions of the tensor. Initially the tensor shown in FIG. 9*a* is loaded from the external memory 35 to the local memory 33. This step is performed using NHWC format, which is the same format that the tensor is initially stored in. Accordingly, there is no permutation of the dimensions as the data is read from the external memory 35. The NHWC data in the local memory 33, shown in FIG. 9*b*, is then written back to the external memory 35 as if it were NCHW data. This writing operation maps the C dimension to the H dimension, the H dimension to the W dimension and the W dimension to the C dimension, resulting in 0312 as shown in FIG. 9*b*. As before, the tensor is split across two horizontal rows in the figures for convenience of presentation only. The tensor can subsequently be read from the external memory 35 in NHWC format with the desired permutation of dimensions having been performed.

FIGS. 10*a* to 10*d* illustrate a method for performing a 0132 permutation of the dimensions of the tensor. As before, in FIG. 10*a*, the original tensor is shown in the external memory 35. The tensor is stored in NHWC format but is read from the external memory 35 in NCHW format, which permutes the dimension of the tensor to 0231 as previously described in connection with FIGS. 6*a* and 6*b*. This tensor in the local memory 33 shown in FIG. 10*b*. The tensor in 10*b* is then subjected to H, W dimension permutation by the PLE 46. This results in a tensor in 0321 format as shown in FIG. 10*c*. The tensor shown in FIG. 10*c* is then written back to the external memory 35 as if it were stored in NCHW format, which results in the data being stored in 0132 as shown in FIG. 10*d*. The data may subsequently be retrieved from the external memory 35 as if it is in the normal NHWC format and the desired permutation of dimensions will have been performed.

Figure 11:
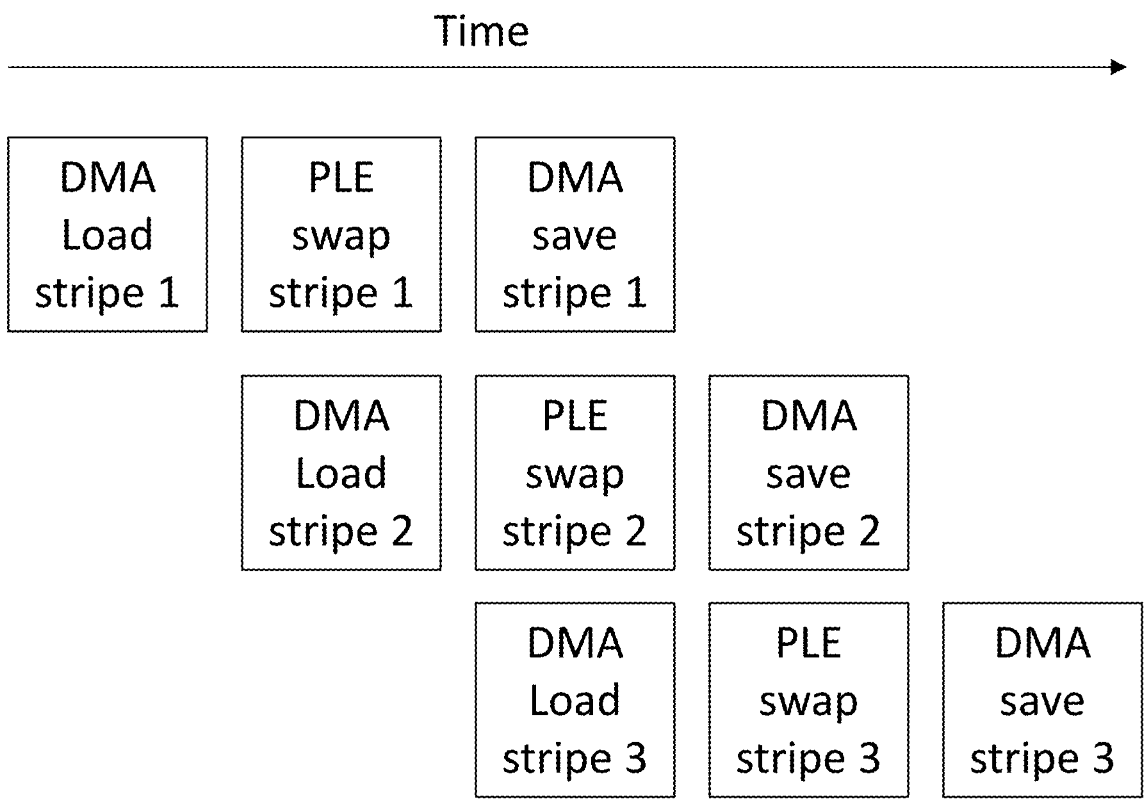
FIG. 11 illustrates pipelining steps for permuting dimensions of a tensor.

The methods described above for permuting dimensions of a tensor may be pipelined as follows. The tensor values may be read from the external memory 35 in stripes. FIG. 11 shows pipelining of the steps of loading a stripe from the external memory 35 to the local memory 33, a swap operation by the PLE 46, and a write operation from the local memory 33 to external memory 35. Permutations 0132, 0213, and 0321 described above all involve these three operations. As shown in FIG. 11, a first stripe of tensor values is read from external memory 35 and written to local memory 33 in the appropriate format as previously described, a PLE operation is then be performed on the first stripe of tensor values. In parallel with the PLE operation on the first stripe of tensor values, a second stripe of tensor values is read from the external memory 35 to the local memory 33. In a following time period, three operations may take place in parallel: the first stripe of data may be written back from the local memory 33 to the external memory 35, the second stripe of tensor values may be subject to a swapping operation by the PLE 46, and a third stripe of tensor values may be read from the external memory 35 to the local memory 33. In the next time period, the second stripe of tensor values may be saved from the local memory 33 to the external memory 35 while the third stripe of tensor values is subject to a swapping operation by the PLE 46. Finally, the third stripe of tensor values is written back from the local memory 33 to the external memory 35.

The above example illustrates the process with three stripes of tensor values, but of course any suitable number of stripes of tensor values may be used. Further, for methods of permuting dimensions of a tensor described above that do not require a swapping operation by the PLE 46, the method may be trivially adapted to pipeline the two steps of reading the tensor values from the external memory 35 to the local memory 33 and writing the tensor values back from the local memory 33 to the external memory 35.

The pipelining described above may find application where the storage capacity of the local memory 33 is limited and a large tensor needs processing. The pipelining means that the methods described above can be applied to smaller 'sub-tensors' and the result built up incrementally in external memory 35.

As noted earlier, the PLE 46 may only be able to access a limited number of tensor values at a time. In this embodiment, the PLE 46 is limited to 16×16 tensor values. However, the neural processing unit 24 may have multiple compute engines, with each compute engine having a PLE 46. According to one embodiment, the neural processing unit 24 has sixteen compute engines. In this and other embodiments, the swapping operation performed by the PLE 46 of swapping the H and W dimensions is parallelized across the computer engines for faster processing. The processed 16×16 blocks are stored in the local memory 33 by the second DMA in a transposed arrangement such that the overall permutation of dimensions of the tensor is achieved.

Embodiments above describe processing on a neural processing unit 24, but the techniques described above are applicable to processors more generally. The method may be used with any processor, such as a graphics processor unit or central processor unit. The techniques may find greater useful application where the processor is constrained and does not already have a dedicated function for permuting dimensions of a tensor.

The methods described above include reading from the external memory 35 to the local memory 33 and writing back from the local memory 33 to the external memory 35. However, for permutations described above that do not permute the dimensions when transferring tensor values from the local memory 33 to the external memory 35, such as the 0213 permutation, the step of writing back from the local memory 33 to the external memory 35 may be unnecessary and the data may be subsequently processed directly from the local memory 33 in some implementations.

An alternative to the methods of permuting a tensor described above would be to use a general-purpose CPU which can access any part of the tensor at any time and so very simply move elements into the required places. However, this would be less efficient, even on a multi-core CPU. Accordingly, offloading this computation to the NPU or another specialized processor allows the CPU to focus on other tasks for which it is more suited.

The above methods may be implemented in software instructions provided in a memory of the processor 24. The software instructions may be stored in a storage of the processor. The methods may also be implemented in hardware such that the processor is configured to perform the methods described above.

Figure 12:
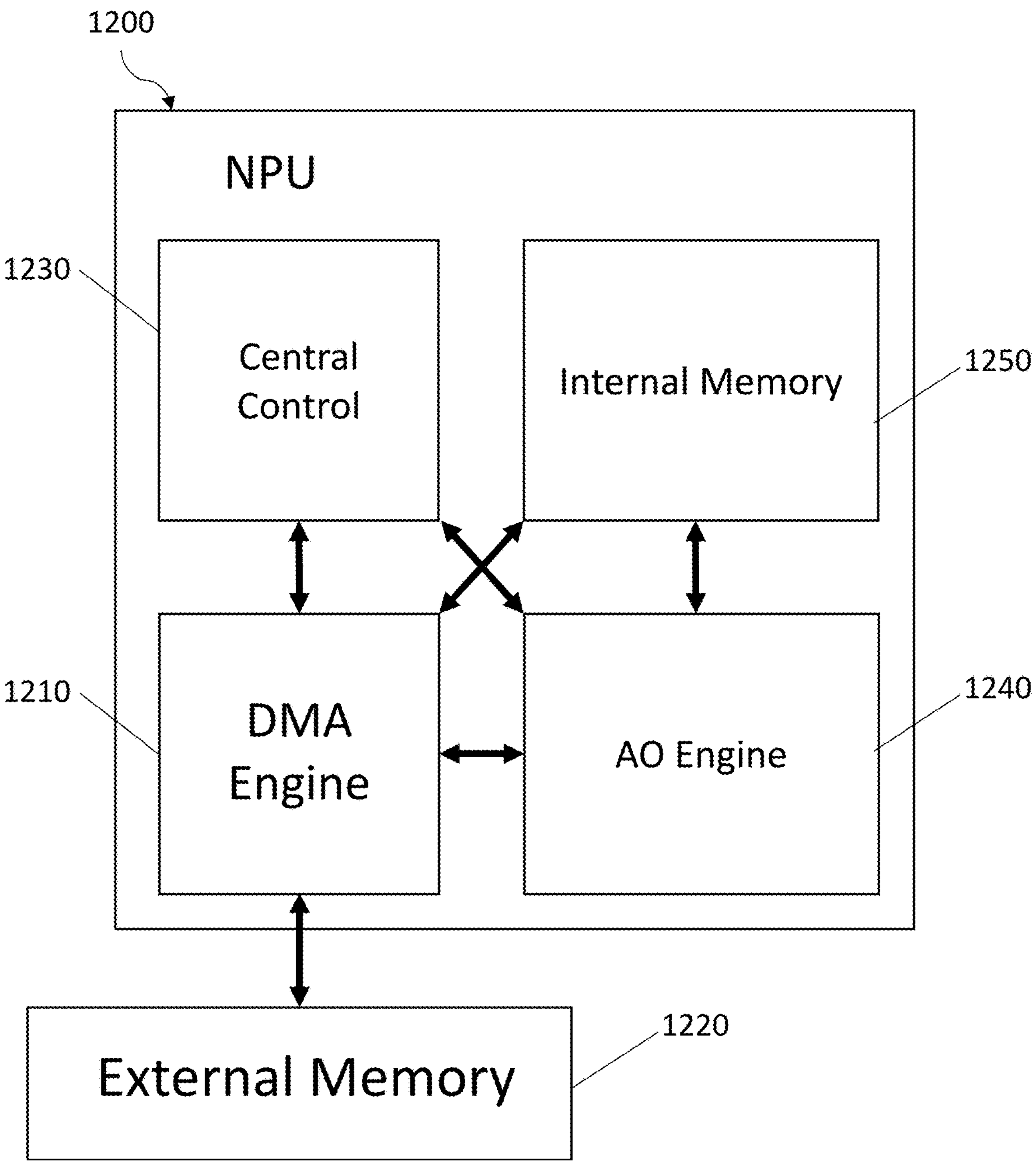
FIG. 12 is a schematic is a schematic diagram showing components of a processing unit.

In the above described methods, it has been explained how multi-dimensional tensors may be permuted by a processor comprising a DMA engine 36 and a PLE 46. These methods may also be applied to other processor configurations. For example, these methods may also be performed by processors having a combination of a DMA engine and an activation-output (AO) engine. FIG. 12 shows such an alternative processing unit, in this case a neural processing unit (NPU) 1200 having a different configuration to neural processing unit 24 of FIG. 3. Neural processing unit 1200 may be configured to perform any of the methods described herein. Neural processing unit 1200 comprises a DMA (Direct Memory Access) engine 1210 configured to read from, and write data to, an external memory 1220. As set out previously, the DMA engine 1210 performs memory access operations, is able to generate memory addresses and is able to initiate read or write cycles from and to external memory 1220. The DMA engine 1210 allows transfer of data between neural processing unit 1200 and external memory 1220 with a lower processor overhead than a system without a DMA engine.

In FIG. 12, DMA engine 1210 is shown as a single unit. However, in some examples, DMA engine may comprise a DMA write engine and a DMA read engine. The DMA write engine and DMA read engine may be separate and distinct hardware elements or may be formed from a single hardware unit that is controllable to perform the functions of standalone DMA write engines and DMA read engines. DMA engine 1210 may further comprise internal non-transitory memory (as described in more detail below) capable of temporarily storing data read by, or being processed by, the DMA engine 1210. This internal non-transitory memory may be a buffer, such as a staging buffer. Additionally, or alternatively, the DMA engine may write to, and read from, other memory on the NPU (1200) such as internal memory (1250).

DMA engine 1210 can be configured to perform two different transpose operations. The first transpose operation may be performed by writing data, to internal or external memory in a "height-first" or a "width-first" order, thereby re-arranging the data as it is written to memory. The second transpose operation is a data scramble operation, which may be performed in conjunction with an internal memory, in which data is broken up and rearranged to provide a different output to the input. More specifically, the data scramble operation reads data from memory, scrambles/re-orders the data and re-writes the data to memory in the new order. This scrambling may, for example, transpose an HWC tensor to an HCW tensor (transposing width and channel bits).

The neural processing unit 1200 further comprises a central control unit 1230. The central control unit 1230 is configured to control each element of the neural processing unit 1200, directing the reading and writing of data between different elements of the neural processing unit 1200 to implement the methods described herein.

The neural processing unit further comprises an activation-output (AO) engine 1240. The AO engine 1240 is in data communication with the DMA engine 1210 and is thus able to receive data from, and send data to, the DMA engine 1210. The AO engine 1240 is also in communication with, and controlled by, the central control unit 1230. The AO engine 1240 is configured to read tensor slices of a multi-dimensional tensor (generally slices is in the "Z" or "C" direction) from an internal memory 1250. The AO engine may perform a transpose operation on the tensor as it reads the tensor slices, by selectively reading data from internal memory 1250 in either row or column order (i.e. height-first or width-first in the Z/C direction). In some examples, the AO engine may further comprise its own internal memory.

The neural processing unit also comprises at least one internal memory 1250. Internal memory 1250 is in data communication with both the DMA engine 1210 and the AO engine 1240. Internal memory 1250 acts as a temporary storage location for data being processed by either or both of the DMA engine 1210 and the AO engine 1240. Internal memory 1250 may be a buffer, such as a staging buffer, accumulation buffer, DRAM, SRAM or any other type of addressable memory. In FIG. 12, internal memory 1250 is shown as a standalone hardware element. However, in further examples, internal memory 1250 may be part of DMA engine 1210 or AO engine 1240. In other examples, both DMA engine 1210 and AO engine 1240 may have their own internal memories which can store data as required by the methods described herein.

As described previously, for a given input HWC (height width channel) tensor, there are 6 possible permutations. These are HWC to HWC, HWC to HCW, HWC to CWH, HWC to WCH, HWC to WHC, and HWC to CHW. NPU 1200 may perform any of these permutations by making use of the three transpose operations that can be performed between the DMA engine 1210 and the AO engine 1240 (using the internal memory 1250 where necessary) in accordance with any of the methods described herein. The transpose operations required to perform each of these permutations are summarized in the below table.

| Permutation Resulting From HWC Input | AO Engine Read Order | DMA Engine Data-Scramble Performed? | DMA Engine Store Order |
|---|---|---|---|
| HWC | Width-First | No | Width-First |
| HCW | Width-First | Yes | Width-First |
| CWH | Height-First | Yes | Height-First |
| WCH | Height-First | Yes | Width-First |
| WHC | Height-First | No | Width-First |
| CHW | Width First | Yes | Height-First |

Figure 13:
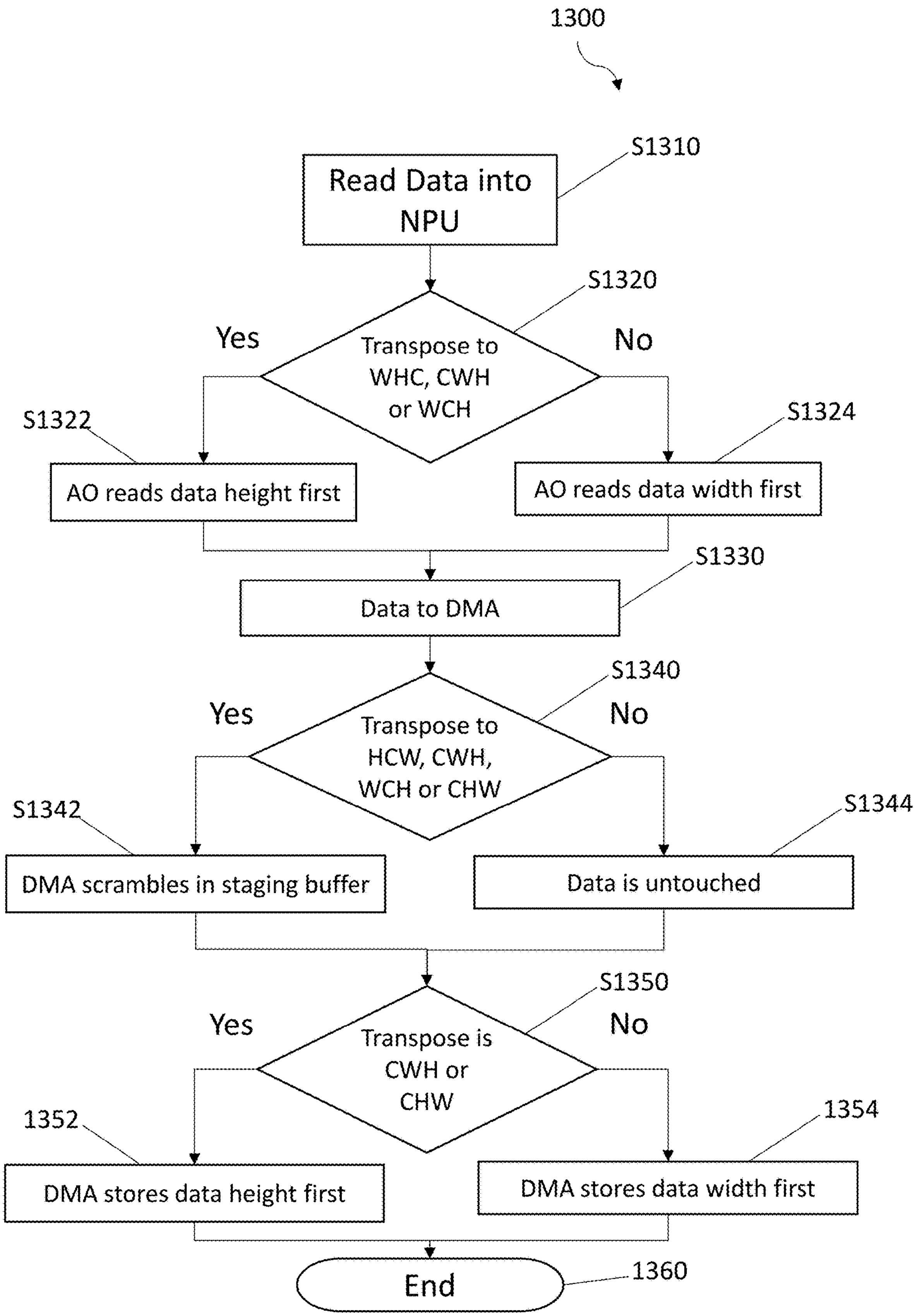
FIG. 13 illustrates a method for permuting dimensions of a tensor.

FIG. 13 illustrates a method of permuting dimensions of a multi-dimensional tensor in more detail. The method of FIG. 13 may be implemented by neural processing unit 1200 of FIG. 12. At step S1310, data is read into the NPU processor which will perform the permutation. The data comprises a multi-dimensional tensor to be permuted. This data may be read in by a DMA engine having direct memory access to an external memory. However, any suitable method of reading data onto the NPU may be used. Data read onto the NPU may be processed, as it is read, in a continuous manner in accordance with the methods described herein. Alternatively, data read onto the NPU may be temporarily stored in internal memory 1250 until all of the requisite data is assembled and sufficient processing resources are available.

The method then continues by determining if the multi-dimensional tensor requires permuting, and if so, which permutation is required. This determination may be made by a central control unit, or any other suitable processor of the NPU. Once the determination is made, instructions to perform the necessary processing steps may be created and sent to a DMA engine and/or AO to perform the necessary processing steps. The determination may be made based on the data to be permuted or based on other data read onto the NPU at step S1310. At step S1320 it is determined whether a permutation of an input HWC tensor to either a WHC tensor, a CWH tensor or a WCH tensor is required. If such a permutation is required the AO engine may read the input HWC tensor at step S1322, either directly from the DMA engine importing the data or from an internal memory 1250, in a height-first order. Otherwise, if permutation to a WHC tensor, a CWH tensor or a WCH tensor is not required, the AO engine reads the input HWC tensor (directly from the DMA engine or internal memory) at step S1324 in a width-first order. Either way, once the AO has read the input HWC tensor, the AO sends the tensor to the DMA at step S1330 for further processing. In some examples, the read data may temporarily be returned to internal memory for later access by the DMA.

Next, at step S1340 further processing may be performed on the data, by the DMA, depending on whether the permutation that is required is to permute the original input HWC tensor to any of a HCW tensor, a CWH tensor, a WCH tensor or a CHW tensor. If data is to be permuted to any of these four tensors, then at step S1342 the DMA engine performs a scramble operation, in conjunction with internal memory. The internal memory used to help perform the scramble operation may be a staging buffer associated with the DMA engine, or any other memory accessible to the DMA engine. If data is not to be permuted to any of these four tensors, then no scramble operation is performed on the data (as illustrated by step S1344).

At step S1350 a further transpose operation is performed depending on whether the original input tensor is to be permuted to a CWH or a CHW tensor. If the input tensor is to be permuted to a CWH or CHW tensor, then as step S1352 the DMA engine stores the input tensor (either currently being processed or retrieved from internal memory) in internal or external memory in a height-first order. If the input tensor is not to be permuted to a CWH or CHW tensor, then the DMA stores the input tensor, in internal or external memory, in a width-first order. After this, further processing of data with the permuted tensor may be performed by the NPU, in which case the permuting method ends at step S1360. Alternatively, the method may be repeated to permute additional multi-dimensional tensors as required. By following these above steps, an input HWC tensor can be permuted to any of the 6 possible permutations using the AO engine and the DMA engine.

In further examples, the methods described herein for permuting multi-dimensional tensors may be performed by a DMA engine in combination with a permutation circuit. The permutation circuit may be configured to perform the operations described above that are assigned to the AO engine. More generally, the permutation circuit may be configured to read arrays of tensor values from a local storage unit and then write the tensor values back to the local storage unit in a different configuration, whereby during the reading and writing operations, at least one dimension of the arrays of tensor values are permuted. The permutation circuit may be part of an AO engine provided on an NPU comprising the DMA engine, separate to the AO engine but within the NPU containing the DMA engine, or separate to the AO engine and implemented externally to the NPU. Returning briefly to the NPU 1200 illustrated in FIG. 12, the permutation circuit could be provided by, for example, the AO engine 1240, the internal memory 1250, or part of the DMA engine 1210.

In still further examples, the methods described herein for permuting multi-dimensional tensors may be performed solely by a DMA engine. For some permutation operations this may require multiple read-write operations to be performed by the DMA engine, in conjunction with local memory. For certain permutation operations, performing the permutation entirely by a DMA engine may be slower than performing the operation with a DMA engine in conjunction with an AO engine. However, an advantage of a DMA-only implementation, is that a wider range of processing devices may be used to apply the methods described herein.

In the above described examples, data corresponding to a permuted multi-dimensional tensor or a partially permuted multi-dimensional tensor (i.e. a tensor which has only been partially permuted and requires further permutation operations to be performed, or a tensor where only part of the tensor has been fully permuted) may be temporarily stored in local memory. In some examples, this data may be further processed at this point. Any neural network processing operation could be performed on the data held in the local storage unit, if the NPU is able to support the processing operation on the particular arrangement of tensor values stored in local memory. For example, an activation function could be applied to data corresponding to a partially permuted convolution layer, thereby generating a partial (output) feature map. Similarly, a convolution or pooling operation could be applied to the data stored in local memory to generate a partial pooled (output) feature map or a partial convolved (output) feature map.

The methods described herein may also be applied to larger dimensioned tensors, such as NHWC tensors. In such cases, the NHWC tensor may be read in successive HWC slices (requiring "N" HWC slices), and the methods described herein applied repeatedly until the whole NHWC tensor is processed. Additionally, or alternatively, a 4-dimensional NHWC tensor may be re-shaped with a pair of the dimensions (i.e. two of the four dimensions) grouped together to form 3-dimensional HWC tensor(s), which can then be processed by the methods described above. Grouping of dimensions in this manner can be performed by suitable software operations. The pair of dimensions which are grouped could be two of any of the dimensions of the multi-dimensional tensor. In still further examples, a 3-dimensional tensor may have two of its dimensions grouped to form a 2-dimensional tensor, after which the above described methods may then be applied.

Any suitable method of reducing the dimensionality of an NHWC tensor may be applied. For example, a tensor re-size operation may be performed to group some of the dimensions of the tensor. Consider a 4-dimensional tensor NHWC, to perform a permutation to change NHWC to WNHC, N and H may be grouped to one dimension. Following this grouping, permuting (NH)WC to W(NH)C can be done in accordance with the methods described herein in a single pass. The reduction of dimensionality may be done as an additional processing step on the NPU, or it may be performed "off-chip" by any suitable processor.

In a further example of grouping to permute a 4-dimensional tensor, consider permutation of a 4-dimensional NHWC tensor to a 4-dimensional CNHW tensor. To achieve this, software may be used to group the "NH" dimensions, and then, as before, the (NH)WC tensor can be treated as a three-dimensional tensor and permuted in accordance with the methods described herein, to arrive at a C(NH)W output tensor. In some examples, it may be necessary to perform an initial permutation operation in order to rearrange an input 4-dimensional tensor in order to enable two dimensions of the input tensor to be grouped together. However, even when this extra permutation is required, any 4-dimensional tensor permutation can be achieved using the NPU hardware described herein in a maximum of two passes, using the sequence of 1) performing a 3-dimensional permutation operation, 2) grouping two or more dimensions, 3) performing a 3-dimensional permutation operation.

To perform such permutation operations, software may be used to arrange the 4-dimensional NHWC tensor in memory so that the tensor is laid out in a regular format and to ensure the stride (the jump necessary to go from a first element to a second element within a dimension) of the two outer dimensions has a relationship defined as:

$$\text{stride of dimension}\text{“}X\text{”} = \text{stride of dimension}\text{“}Y\text{”}{*}dim\ \text{“}Y\text{”}$$

Where "dim" is a function which returns the number of elements in a specified dimension of an array (i.e. provides the "size"). If we are grouping the N and H dimensions of a 4-dimensional tensor, this could be expressed as:

$$\text{stride } N = \text{stride } H^{*} dim\ H$$

If this relationship exists, it is possible to then express this as:

$$dim\ NH = dim\ N^{*} dim\ H$$

$$\text{stride } NH = \text{stride } H$$

Consequently, the two dimensions (NH) can be grouped together. Once grouped, the grouped dimensions of a multi-dimensional tensor may be considered together as a "single" dimension by the hardware of the NPU, as explained above. The choice of which dimensions of a given multi-dimensional tensor to group is decided by software, depending on which dimensions are easiest to group/shape into the above described relationship. Generally, in order to group two dimensions "A" and "B", to "(AB)", the two dimensions will need to be next to each other and conform to the relationship stride A=stride B*size B Grouping of dimensions may enable any arbitrarily dimensioned tensor to be permuted. However, in some cases, multiple passes through the methods described herein may be required to get to the final permutation. In this multiple pass approach, as before grouping of dimensions may be performed by software, before the NPU hardware is used to permute two or more dimensions in each pass. Consider, for example, the permutation of a 6-dimensional tensor in the input format "ABCDEF" which is to be permuted to a second 6-dimensional tensor in an output "DEBCAF" format. In the first pass, software may be used to group dimensions "BCDE" and then the NPU hardware is used to perform a H↔W transpose operation (as described previously), resulting in a change from a "A(BCDE)F" tensor to a "(BCDE)AF" tensor. In a second pass, software may again be used to group one or more dimensions of the tensor, for example forming three groups "BC", "DE", and "AF" and then performing a second H↔W transpose operation, resulting in a change from a "(BC)(DE)(AF)" tensor to a "(DE)(BC)(AF)" tensor, which is the desired output format for the 6-dimensional tensor.

In the above described methods, it has been explained how to process multi-dimensional tensor of a type that may be used in a neural network. In use, some of these multi-dimensional tensors may define a compressed feature map of a neural network, where the feature map has been compressed in an effort to reduce the memory storage size needed to store the feature map. In such examples, it may be beneficial to de-compress the compressed feature map before permuting the resultant multi-dimensional tensor that defines the de-compressed feature map.

This de-compression step may be performed in accordance with any known method of de-compression. The de-compression may be performed on the NPU, after the data has been read on to the NPU but before permutation is applied. Alternatively, de-compression may be performed "off-chip" by any suitable external processor. Once decompressed, the multi-dimensional tensor defining the decompressed feature map may be stored in external memory, or local memory, and thereafter processed in accordance with the methods described herein.

In still further examples, it may be beneficial to compress, or re-compress, a permuted multi-dimensional tensor, in order to reduce the size of the permuted multi-dimensional tensor. Such compression may be performed in accordance with any known method of compression, either on the NPU following permutation, or "off-chip" by any suitable processor. Once compressed, the multi-dimensional tensor defining the compressed feature map may be stored in external memory, or local memory, and thereafter processed as necessary.

In one example, a compressed feature map data may be fetched from external (off-processor) memory, decompressed, and then a permutation operation performed, in accordance with the methods described herein. This permutation operation may be performed by a DMA engine reading all, or a part, of the decompressed feature map in a height first or width first order, with the feature map then being written into internal memory. The decompression operation may be performed by any suitable processor implementing any suitable decompression algorithm. The decompression operation may be performed during transfer of all or part of the compressed feature map from first storage to second storage. Decompressing during transfer may be advantageous as the number of memory read/write operations can be reduced. Alternatively, the decompression operation may be performed externally from the NPU before any transfer occurs onto the NPU (which may require reading data from external memory, decompressing, then writing back to external memory), or internally within the NPU after transfer (which may require reading data from internal memory, decompressing, then writing back to internal memory storage). Optionally, the decompressed data stored in the internal memory may then have further operations performed on it (for example a further permutation operation) by an AO engine, or the DMA engine (as described previously). Following these steps, the DMA engine and/or a compressor block may then compress the data (forming a compressed feature map), after which the compressed data may be written out to external memory or used by other elements of the processor.

What is claimed is:

1. A method performed by a processor for permuting dimensions of a multi-dimensional tensor, wherein the processor comprises a direct memory access (DMA) engine, and wherein the multi-dimensional tensor contains an array of tensor values in three or more dimensions that are stored in a first storage unit, the method comprising:
- transferring the array of tensor values from the first storage unit to a second storage unit by reading tensor values from the first storage unit that are arrayed along a first dimension of the multi-dimensional tensor and writing the corresponding tensor values to the second storage unit in locations corresponding to a second dimension of the multi-dimensional tensor,
- wherein the method further comprises the DMA engine permuting a pair of dimensions of the multi-dimensional tensor, wherein permuting the pair of dimensions of the multi-dimensional tensor by the DMA engine comprises:
  - reading, by the DMA engine, a tensor slice of the multi-dimensional tensor in either a row order or a column order, or
  - performing, by the DMA engine, a data scramble operation.

2. A method according to claim 1, wherein the first storage unit is one of an external storage unit in communication with the processor and a local storage unit of the processor and the second storage unit is the other of the external storage unit in communication with the processor and the local storage unit of the processor.

3. A method according to claim 1, wherein the processor is at least one of a neural processing unit, a graphics processing unit, a coprocessor, an accelerator and a central processing unit.

4. A method according to claim 1, wherein the multi-dimensional tensor is a feature map of a neural network.

5. A method according to claim 4, wherein at least one of:
- the multi-dimensional tensor defines a compressed feature map of the neural network, and wherein the method further comprises:
  - decompressing the compressed feature map and storing the decompressed feature map in the first storage unit or the second storage unit; or
  - compressing the feature map defined by the multi-dimensional tensor and storing the compressed feature map in the first storage unit or the second storage unit.

6. A method according to claim 1, further comprising:
- grouping a pair of dimensions of the multi-dimensional tensor before transferring the array of tensor values from the first storage unit to the second storage unit.

7. A method according to claim 1, wherein the processor comprises one or more programmable engines, wherein the method further comprises the one or more programmable engines permuting a pair of dimensions of the multi-dimensional tensor.

8. A method according to claim 7, wherein at least one of:
- the one or more programmable engines have a maximum number of tensor values that it can operate on in a cycle, wherein the method comprises the one or more programmable engines sequentially: reading sub-blocks of the multi-dimensional tensor from a local storage, permuting the pair of dimensions of the sub-block of the multi-dimensional tensor and writing the permuted sub-blocks to the local storage of the processor, wherein the sub-blocks are read from and written to the local storage using addresses in the local storage so as to re-order the sub-blocks to complete the permutation of the pair of dimensions across the multi-dimensional tensor, wherein the local storage is one of the first storage unit and the second storage unit; or
- the one or more programmable engines is a plurality of programmable engines, wherein the method comprises two or more of the programmable engines permuting the pair of dimensions of the multi-dimensional tensor in parallel.

9. A method according to claim 1, wherein tensor values are read from the first storage unit and written to the second storage unit in stripes of data, wherein the method comprises transferring the array of tensor values from the second storage unit to the first storage unit, wherein transferring the stripe of tensor values from the first storage unit to the second storage unit occurs in parallel with transferring another stripe of tensor values from the second storage unit to the first storage unit.

10. A method according to claim 9, further comprising one or more programmable engines permuting a pair of dimensions of a further stripe of the multi-dimensional tensor in parallel with at least one of transferring the stripe of tensor values from the first storage unit to the second storage unit and transferring another stripe of tensor values from the second storage unit to the first storage unit.

11. A method according to claim 1, wherein the processor comprises an activation-output (AO) engine, wherein the method further comprises the AO engine permuting a pair of dimensions of the multi-dimensional tensor.

12. A method according to claim 11, wherein permuting the pair of dimensions of the multi-dimensional tensor by the AO engine comprises reading, by the AO engine, tensor slices of the multi-dimensional tensor in either a row order or a column order.

13. A method according to claim 1, wherein the processor comprises a permutation circuit, wherein the first storage unit is a local storage unit, wherein the second storage unit is an external storage unit in communication with the processor, the method further comprising:
- reading, by the DMA engine, a first array of tensor values, from the external storage unit;

writing, by the DMA engine, the first array of tensor values in the local storage unit as a second array of tensor values;

reading, by the permutation circuit, the second array of tensor values from the local storage unit;

writing, by the permutation circuit, the second array of tensor values in the local storage unit as a third array of tensor values;

reading, by the DMA engine, the third array of tensor values from the local storage unit; and writing, by the DMA engine, the third array of tensor values in the external storage unit as a fourth array of tensor values, wherein the fourth array of tensor values corresponds to the first array of tensor values having been permuted in at least one dimension, and wherein the permutation is performed by one or both of the DMA engine and the permutation circuit during their respective reading and writing operations.

14. A processor for permuting dimensions of a multi-dimensional tensor, wherein the multi-dimensional tensor contains an array of tensor values in three or more dimensions that are stored in a first storage unit, the processor comprising:

a controller configured to control transfer of the array of tensor values from the first storage unit to a second storage unit by reading tensor values from the first storage unit that are arrayed along a first dimension of the multi-dimensional tensor and writing the corresponding tensor values to the second storage unit in locations corresponding to a second dimension of the multi-dimensional tensor, wherein permuting dimensions of the multi-dimensional tensor comprises at least one of:

reading, by an activation-output (AO) engine of the processor, tensor slices of the multi-dimensional tensor in either a row order or a column order; or by a direct memory access (DMA) engine of the processor:

reading a tensor slice of the multi-dimensional tensor in either a row order or a column order; or performing a data scramble operation.

15. The processor according to claim 14, wherein the processor comprises a permutation circuit, wherein the first storage unit is a local storage unit, wherein the second storage unit is an external storage unit in communication with the processor, wherein permuting dimensions of the multi-dimensional tensor comprises:

reading, by the DMA engine, a first array of tensor values, from the external storage unit;

writing, by the DMA engine, the first array of tensor values in the local storage unit as a second array of tensor values;

reading, by the permutation circuit, the second array of tensor values from the local storage unit;

writing, by the permutation circuit, the second array of tensor values in the local storage unit as a third array of tensor values;

reading, by the DMA engine, the third array of tensor values from the local storage unit; and writing, by the DMA engine, the third array of tensor values in the external storage unit as a fourth array of tensor values, wherein the fourth array of tensor values corresponds to the first array of tensor values having been permuted in at least one dimension, and wherein the permutation is performed by one or both of the DMA engine and the permutation circuit during their respective reading and writing operations.

16. A method performed by a processor for permuting dimensions of a multi-dimensional tensor, wherein the processor comprises an activation-output (AO) engine, and wherein the multi-dimensional tensor contains an array of tensor values in three or more dimensions that are stored in a first storage unit, the method comprising:

transferring the array of tensor values from the first storage unit to a second storage unit by reading tensor values from the first storage unit that are arrayed along a first dimension of the multi-dimensional tensor and writing the corresponding tensor values to the second storage unit in locations corresponding to a second dimension of the multi-dimensional tensor wherein the method further comprises the AO engine permuting a pair of dimensions of the multi-dimensional tensor, wherein permuting the pair of dimensions of the multi-dimensional tensor by the AO engine comprises reading, by the AO engine, tensor slices of the multi-dimensional tensor in either a row order or a column order.

17. The method according to claim 16, wherein the first storage unit is one of an external storage unit in communication with the processor and a local storage unit of the processor and the second storage unit is the other of the external storage unit in communication with the processor and the local storage unit of the processor.

18. The method according to claim 16, wherein the processor is at least one of a neural processing unit, a graphics processing unit, a coprocessor, an accelerator and a central processing unit.

19. The method according to claim 16, wherein the multi-dimensional tensor is a feature map of a neural network.

20. The method according to claim 19, wherein at least one of:

the multi-dimensional tensor defines a compressed feature map of the neural network, and wherein the method further comprises:

decompressing the compressed feature map and storing the decompressed feature map in the first storage unit or the second storage unit; or compressing the feature map defined by the multi-dimensional tensor and storing the compressed feature map in the first storage unit or the second storage unit.

* * * * *